Oct. 10, 1961  M. HOROVITZ  3,003,738
RESILIENT MOUNTINGS
Filed June 30, 1958  2 Sheets-Sheet 2
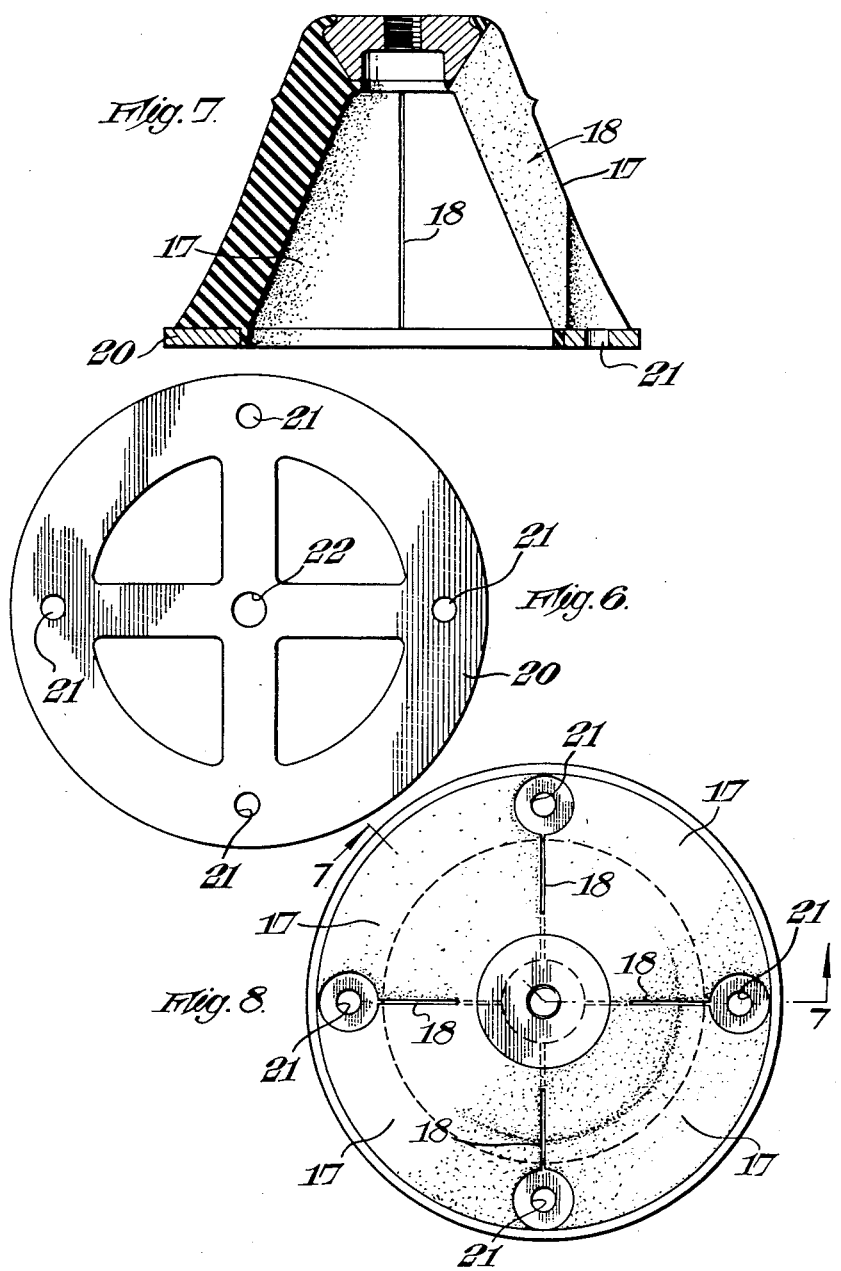

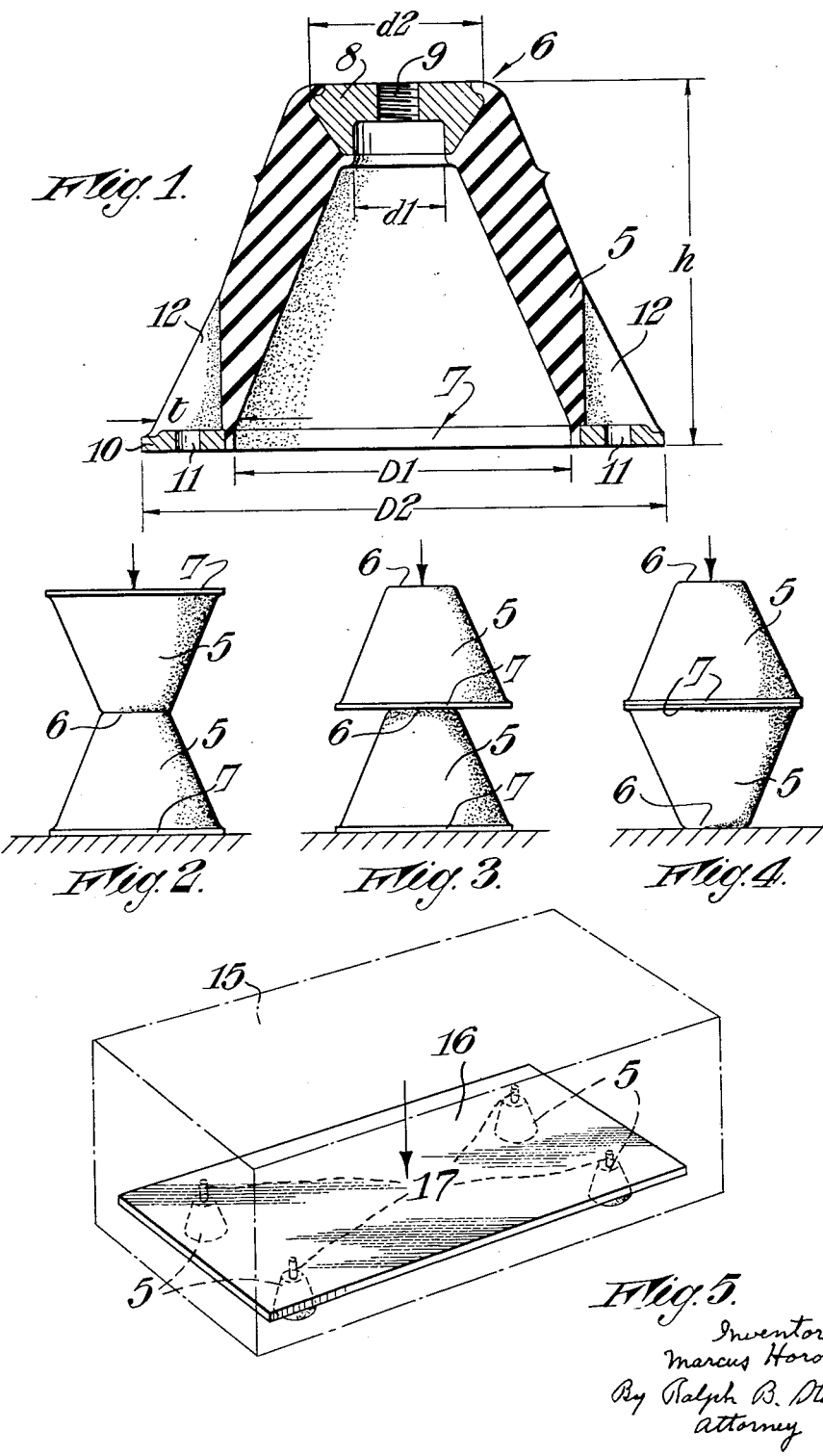

ated Oct. 10, 1961

3,003,738
RESILIENT MOUNTINGS
Marcus Horovitz, Leicester, England, assignor to Metalastik Limited, Leicester, England, a British company
Filed June 30, 1958, Ser. No. 745,445
5 Claims. (Cl. 248—358)

This invention concerns resilient mountings of the kind comprising a resilient flexible body of annular form which under axial compressive forces of small magnitude behaves as a relatively stiff strut but which, under increased loads in said direction, buckles into flexure and is relatively soft. Hitherto it has been proposed that a mounting of the kind set forth comprise an annular body which is concave outside and substantially flat inside throughout its medium portion and is substantially flat outside and concave inside its two end portions, the end portions being adjacent to a lowering plate and a base plate respectively. With this arrangement when the mounting buckles the upper part of the mounting is folded down upon the lower part, the central portion being forced radially inwardly of the mounting. The present invention has for its object to provide an improved construction of mounting of the kind set forth and the present invention is characterised in that the resilient, flexible strut is of frusto-conical shape, the strut when subjected to an axial compressive load producing buckling by collapse of the end of the strut of smaller diameter into the hollow strut.

According to one feature of the invention the strut has a solid surface of revolution. Alternatively, however, the strut may comprise in plurality of circumferentially-spaced legs arranged in conic outline.

Practical applications of the present invention will now be described, by way of example only, with reference to the accompanying drawings whereof:

FIG. 1 is a sectional elevation of a mounting in accordance with the present invention, FIG. 2 is a diagrammatic view of an assembly comprising a pair of mountings according to this invention, FIGS. 3 and 4 are alternative constructions of the assembly of FIG. 2, FIG. 5 is a diagrammatic perspective view of a packing case installation incorporating mountings according to this invention, FIG. 6 shows an adaptor plate used in the assembly of FIG. 3, FIG. 7 is a sectional elevation of another mounting in accordance with the present invention, and FIG. 8 is a plan of the mounting shown in FIG. 7.

Referring to FIG. 1: the mounting comprises a hollow, frusto-conical, thin-walled body 5 of rubber-like material, the end 6 of small diameter being closed while the end 7 of larger diameter is open.

The end 6 of the body 5 bonded to it a circular, plate-like, metal member 8 having a hole therethrough by which the plate may be attached to a support part or a part to be supported.

A ring-like metal member 10 is bonded to the end 7 of the body 5, the ring 10 having spaced holes 11 by which it may be attached to a base or other part. Above each hole 11 the material of the body 5 is cut away, as at 12, to give access to the attachment bolts or the like.

In the particular arrangement being described the internal diameter $d1$ of the end 6 is approximately one-third of the inside diameter $D1$ of the end 7 and similarly the outside diameter $d2$ of the end 6 is about one-third of the outside diameter $D2$ of the end 7. The diameters $d1$, $d2$ may vary from between one-quarter and one-half of the diameters $D1$, $D2$ respectively.

It is preferred that the outside diameter $d2$ equals about one-half of the inside diameter $D1$ and the height $h$ is about equal to the inside diameter $D1$. Finally wall thickness $t$ is substantially uniform over the height of the body 5 and varies from one-eighth to one-quarter of the outside diameter $D2$ and is preferably one-sixth thereof. Since the outside diameter $d2$ is smaller than the inside diameter $D1$ it is possible for the end 6 to be deflected under an axial load into the hollow body 5 so that upon maximum deflection the end plate 8 enters the open end 7 or passes wholly or in part therethrough.

According to a feature of the invention it may be arranged that two mountings are used in pairs to produce a mounting assembly. Such arrangements are shown diagrammatically in FIGS. 2, 3, and 4.

In FIG. 2 a pair of bodies 5 are placed end to end so that the small ends 6 thereof abut. The small end may be secured together by a bolt or the like passing through the end plate of each of the mountings. In FIG. 3 the mountings 5 are placed end to end one on top of the other so that the larger end 7 of the upper mounting abuts the smaller end 6 of the lower mounting. To this end the bottom plate or member 10 of the upper mounting is modified by attaching to it an adaptor plate 20 (see FIG. 6). The adaptor plate has spaced holes 21 which align with the holes 11 in the member 10, and a central hole 22 which aligns with the hole in the member 8 at the smaller end of the lower mounting. The plate 20 is attached to the member 10 of the upper mounting and the member 8 of the lower mounting by bolts or the like passing through the aligning holes. In FIG. 4 the mountings 5 are placed end to end with the larger ends abutting.

The application of the mounting of FIG. 1 to a packing case installation is illustrated diagrammatically in FIG. 5.

The packing case is generally indicated at 15 and there is a platform 16 within the packing case. The platform 16 is provided to receive a piece of machinery or some other body which is to be mounted within the packing case in such manner that the transmission of vibrations and shocks from the packing case to the machinery or other body is reduced or eliminated. To this end the platform 6 is supported from the base of the case 15 by a plurality of spaced mountings 5, the platform 16 being connected to the smaller ends of the mountings 5 by posts 17. Four mountings are shown in FIG. 5 but it will be appreciated that three or more mountings may be used.

In the example described with reference to FIG. 1, the wall of the body 5 is continuous in cross-sectional planes taken at right angles to the axis of the body. In an alternative construction, as shown in FIGURES 6 and 7, the body comprises four circumferentially-spaced legs 17 arranged in conical outline, the legs being arcuate in cross-section with their concave surfaces directed inwardly towards the axis of the body. The legs 17 are divided by the slots 18. In all other respects the mounting shown in FIGURES 6 and 7 corresponds with that as described with reference to and as shown in FIGURE 1.

I claim:

1. A resilient mounting comprising a hollow resilient flexible body, and attachment means on each end of the body for connecting the body between a support and an article to be mounted on the support so that the resulting load is taken solely by the body which then acts as a strut supporting the article from the support, said body comprising a frusto-conical wall of substantially uniform thickness and having inner and outer wall surfaces defined by internal and external diameters at the smaller and larger ends thereof, the internal and external diameters of the smaller end of the body being between one quarter and one half the internal and external diameters respectively of the larger end of the body, the internal diameter at the larger end being at least as large as the external diameter at the smaller end and the height of the body being about equal to the inside diameter of the larger end of the body whereby the body when subjected to axial compressive loads less than a predetermined load retains its frusto-conical form and behaves as a relatively stiff strut, and when subjected to an axially compressive load in excess of said predetermined load buckles into flexure by collapse of its smaller end into the hollow interior of the body and becomes relatively soft.

2. A mounting according to claim 1, wherein the wall of the body is continuous in cross sectional planes taken normal to the axis of the body.

3. A mounting as claimed in claim 1, in which the wall thickness of the body is from one eighth to one quarter of the outside diameter of the larger end of the body.

4. A mounting according to claim 1 wherein the body comprises a plurality of circumferentially-spaced legs arranged in conic outline.

5. A mounting as claimed in claim 4 wherein the legs are arcuate in cross-section with the concave surface directed inwardly towards the axis of the body.

References Cited in the file of this patent

UNITED STATES PATENTS

| | | |
|---|---|---|
| 2,379,763 | Sweet | July 3, 1945 |
| 2,600,090 | Barber | June 10, 1952 |
| 2,724,588 | Sheets | Nov. 22, 1955 |

FOREIGN PATENTS

| | | |
|---|---|---|
| 823,644 | France | Oct. 18, 1937 |